United States Patent
Yu et al.

(10) Patent No.: US 9,552,618 B2
(45) Date of Patent: Jan. 24, 2017

(54) METHOD FOR DOMAIN SHADING, AND DEVICES OPERATING THE SAME

(71) Applicant: Samsung Electronics Co., Ltd., Suwon-Si, Gyeonggi-Do (KR)

(72) Inventors: Chang Hyo Yu, Yongin-si (KR); Seok Hoon Kim, Suwon-si (KR)

(73) Assignee: SAMSUNG ELECTRONICS CO., LTD., Gyeonggi-do (KR)

(*) Notice: Subject to any disclaimer, the term of this patent is extended or adjusted under 35 U.S.C. 154(b) by 105 days.

(21) Appl. No.: 14/534,441

(22) Filed: Nov. 6, 2014

(65) Prior Publication Data

US 2015/0138197 A1 May 21, 2015

(30) Foreign Application Priority Data

Nov. 19, 2013 (KR) .................. 10-2013-0140915

(51) Int. Cl.
G06T 17/20 (2006.01)
G06T 1/20 (2006.01)
G06T 15/00 (2011.01)

(52) U.S. Cl.
CPC .............. G06T 1/20 (2013.01); G06T 15/005 (2013.01); G06T 17/20 (2013.01)

(58) Field of Classification Search
None
See application file for complete search history.

(56) References Cited

U.S. PATENT DOCUMENTS

| | | | |
|---|---|---|---|
| 7,227,556 B2 | 6/2007 | O'Driscoll | |
| 7,746,355 B1 | 6/2010 | Cai et al. | |
| 7,928,979 B2 | 4/2011 | Patel et al. | |
| 8,144,147 B2 | 3/2012 | Munkberg et al. | |
| 8,284,197 B2 | 10/2012 | Barczak | |
| 2008/0079719 A1 | 4/2008 | Woo | |
| 2009/0237401 A1 | 9/2009 | Wei et al. | |
| 2010/0253683 A1 | 10/2010 | Munkberg et al. | |
| 2010/0302246 A1 | 12/2010 | Jiao et al. | |
| 2011/0018874 A1 | 1/2011 | Hasselgren et al. | |
| 2011/0057931 A1 | 3/2011 | Goel et al. | |
| 2011/0063294 A1 | 3/2011 | Brown et al. | |
| 2011/0080405 A1 | 4/2011 | Moreton et al. | |
| 2011/0128285 A1 | 6/2011 | Gong | |
| 2012/0229464 A1 | 9/2012 | Fishwick | |
| 2014/0022264 A1* | 1/2014 | Shreiner | G06T 17/20 345/520 |
| 2014/0098117 A1* | 4/2014 | Goel | G06T 1/20 345/522 |
| 2014/0210819 A1* | 7/2014 | Mei | G06T 17/20 345/423 |

OTHER PUBLICATIONS

Microsoft ("Shader Stages," Apr. 22, 2012, https://web.archive.org/web/20120422145655/http://msdn.microsoft.com/en-us/library/windows/desktop/bb205146(v=vs.85).aspx.*

* cited by examiner

*Primary Examiner* — Kee M Tung
*Assistant Examiner* — Nicholas R Wilson
(74) *Attorney, Agent, or Firm* — Harness, Dickey & Pierce, P.L.C.

(57) ABSTRACT

A method for domain shading may include analyzing graphics state data, and generating all first primitives through a single-pass domain shading or generating only second primitives which are visible among the first primitives through a two-pass domain shading based on a result of the analysis.

20 Claims, 9 Drawing Sheets

METHOD FOR DOMAIN SHADING, AND DEVICES OPERATING THE SAME

CROSS-REFERENCE TO RELATED APPLICATIONS

This application claims priority under 35 U.S.C. §119(a) from Korean Patent Application No. 10-2013-0140915 filed on Nov. 19, 2013, the disclosure of which is hereby incorporated by reference in its entirety.

BACKGROUND

Embodiments of the present inventive concepts relate to a method for domain shading.

A graphics processing unit (GPU) renders an image of an object to be displayed on a display. In recent years, the GPU performs a tessellation operation so as to more minutely render the image of an object during a process of rendering the image of an object.

The GPU generates a plurality of primitives for the image of an object through the tessellation operation, receives information for generating the plurality of primitives from an external memory, and transmits the finally generated primitives to a next step or stores the primitives in the external memory. The GPU obtains all data corresponding to the plurality of primitives so as to perform an operation after the tessellation operation, thereby causing a waste of bandwidth of data, and a large amount of calculation loads and power consumption.

SUMMARY

An embodiment of the present inventive concepts is directed to a method for domain shading, including analyzing graphics state data, and generating all first primitives through a single-pass domain shading according to a result of the analysis or generating only second primitives which are visible among the first primitives through a two-pass domain shading.

According to an example embodiment, when a number of attributes to be generated for each of the first primitives is smaller than a set value, all of the attributes of the first primitives may be calculated through the single-pass domain shading, and the first primitives may be generated according to a result of the calculation. According to another example embodiment, when a blending operation is activated, all attributes of the first primitives may be calculated through the single-pass domain shading, and the first primitives may be generated according to a result of the calculation.

According to still another example embodiment, when a range of two-dimensional space coordinates of the first primitives is not maintained through a location modification calculation performed by a geometry shader, all attributes of the first primitives may be calculated through the single-pass domain shading, and the first primitives may be generated according to a result of the calculation.

According to still another example embodiment, when relative depth values between the first primitives are not maintained through a depth modification calculation after the first primitives are processed by a geometry shader, all attributes of the first primitives may be calculated through the single-pass domain shading, and the first primitives may be generated according to a result of the calculation.

According to still another example embodiment, when (i) a number of the attributes to be generated for each of the first primitives is greater than or equal to a set value, (ii) a blending operation is not activated, (iii) a range of two-dimensional space coordinates of the first primitives is maintained through a location modification calculation performed by a geometry shader, and (iv) relative depth values between the first primitives are maintained all the time after the geometry shader, then (i) only location attributes may be first calculated among the attributes of the first primitives, (ii) third primitives which are invisible among the first primitives may be removed, (iii) the rest attributes other than location attributes of the second primitives may be calculated, and (iv) the second primitives may be generated according to a result of the calculation.

The analysis may be performed by a central processing unit (CPU) or a graphics processing unit (GPU). The depth modification calculation may be performed by the geometry shader or a pixel shader.

An example embodiment of the present inventive concepts is directed to a graphics processing unit, including a control logic which analyzes graphics state data and is configured to control a domain shading according to a result of the analysis, and a domain shader. The domain shader includes a first domain shader which calculates space coordinates included in first primitives using data output from a hull shader and tessellation data output from a tessellator, a primitive assembler which generates first primitives having only location attributes using the calculated space coordinates, a primitive culling unit which removes primitives that are invisible among the first primitives having location attributes only and generates only second primitives that are visible, and a second domain shader which calculates the rest attributes other than the location attributes of the second primitives. The domain shader generates all of the first primitives through a single-pass domain shading, and generates the second primitives through a two-pass domain shading according to a control of the control logic.

According to an example embodiment, the control logic may be configured to control the domain shader so that the domain shader may perform the single-pass domain shading when a number of attributes to be generated for each of the first primitives is smaller than a set value. According to still another example embodiment, the control logic may be configured to control the domain shader so that the domain shader may perform the single-pass domain shading when a blending operation is activated.

According to still another example embodiment, the control logic may be configured to control the domain shader so that the domain shader may perform the single-pass domain shading when a range of two-dimensional space coordinates of the first primitives is not maintained through location modification calculation performed by the geometry shader.

According to still another example embodiment, the control logic may be configured to control the domain shader so that the domain shader may perform the single-pass domain shading when relative depth values between the first primitives are not maintained through a depth modification calculation after the first primitives are processed by the geometry shader.

According to still another example embodiment, when a number of attributes to be generated for each of the first primitives is greater than or equal to a set value, a blending operation is not activated, a range of two-dimensional space coordinates of the first primitives is maintained through a location modification operation performed by the geometry shader, and relative depth values among the first primitives are always maintained after the geometry shader, then the control logic may be configured to control the domain shader so that the domain shader may perform the two-pass domain shading.

An example embodiment of the present inventive concepts is directed to a system on chip, including the graphic processing unit and a CPU which controls the graphic processing unit.

BRIEF DESCRIPTION OF THE DRAWINGS

These and/or other aspects and advantages of the present inventive concepts will become apparent and more readily appreciated from the following description of the embodiments, taken in conjunction with the accompanying drawings of which.

DETAILED DESCRIPTION OF THE EMBODIMENTS

The present inventive concepts now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
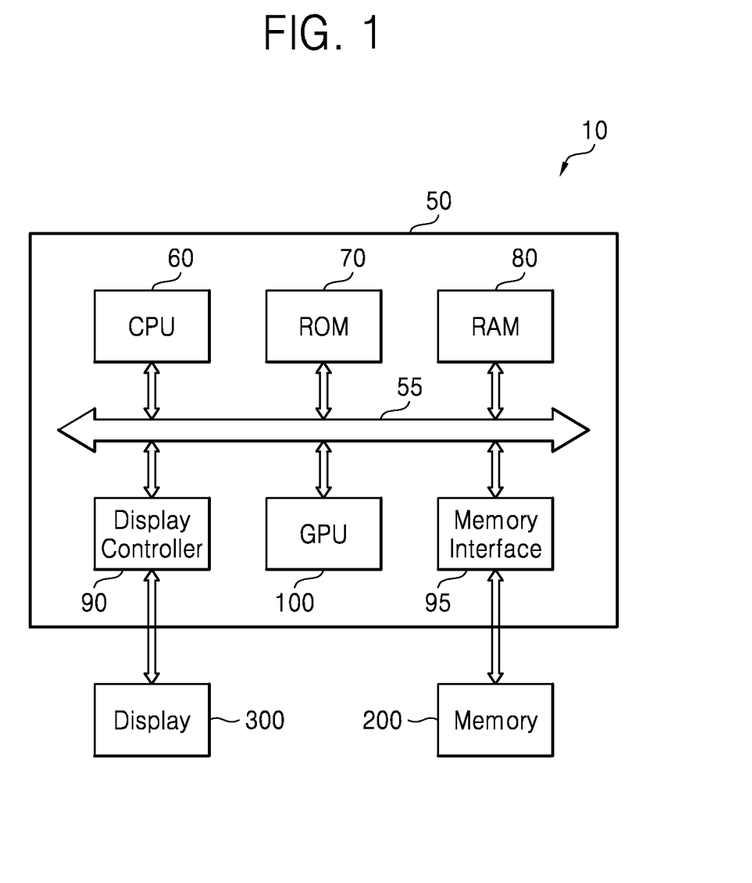
FIG. 1 is a block diagram of a data processing system according to an example embodiment of the present inventive concepts.

FIG. 1 is a block diagram of a data processing system according to an example embodiment of the present inventive concepts. Referring to FIG. 1, a data processing system 10 may be embodied as a personal computer (PC), a two-dimensional (2D) TV, a three-dimensional (3D) TV, a portable electronic device or mobile device, or an electronic device which includes a display 300 which may display image data.

The portable electronic device may be embodied as a laptop computer, a mobile phone, a smart phone, a tablet PC, a mobile internet device (MID), a wearable computer, a personal digital assistant (PDA), an enterprise digital assistant (EDA), a digital still camera, a digital video camera, a portable multimedia player(PMP), a personal navigation device or portable navigation device (PND), a handheld game console, an internet of things (IoT) device, an internet of everything (IoE) device, or an e-book.

The data processing system 10 may include a data processing device 50, an external memory 200, and a display 300.

The data processing device 50 may control the external memory 200 and/or the display 300. That is, the data processing device 50 may entirely control an operation of the data processing system 10. The data processing device 50 may be embodied as a printed circuit board (PCB) such as a motherboard, an integrated circuit (IC), or a system on chip (SoC). For example, the data processing device 50 may be an application processor.

The data processing device 50 may include a central processing unit (CPU) 60, a read only memory (ROM) 70, a random access memory (RAM) 80, a display controller 90, a memory interface 95, and a graphics processing unit (GPU) 100. According to an example embodiment, the data processing device 50 may further include a graphics memory (not shown) which stores data to be used in the GPU 100.

The CPU 60 may control an entire operation of the data processing device 50. For example, the CPU 60 may control a ROM 70, a RAM 80, a display controller 90, a memory interface 95, and/or the GPU 100 through a bus 55.

The CPU 60 may read and perform program instructions. For example, the CPU 60 may perform an application, e.g., a 3D application or a 3D game application.

The 3D application or the 3D game application may output 3D application programming interface (API) commands. In order to render 3D computer graphics according to the 3D API commands, 3D API, e.g., OpenGL™ or Direct3D™, used in applications may be executed.

For example, the 3D API stored in a memory 80 or 200 may be loaded to the GPU 100 and performed according to a control of the CPU 60. According to an example embodiment, the CPU 60 may be embodied in a multi-core. The multi-core may be a computing component having two or more independent cores.

The ROM 70 may permanently store programs and/or data. According to an example embodiment, the ROM 70 may be embodied in an erasable programmable read-only memory (EPROM) or an electrically erasable programmable read-only memory (EEPROM).

The RAM 80 may temporarily store data, instructions, and/or programs (or program modules) needed in the CPU 60 or the GPU 100. For example, programs and/or data stored in a memory 70 or 200 may be temporarily stored in the RAM 80 according to a control of the CPU 60, a control of the GPU 100, or a booting code stored in the ROM 70.

The RAM 80 may store an operating system (OS), application programs, other program modules, and/or program data. According to an example embodiment, the RAM 80 may be embodied as a dynamic RAM (DRAM) or a static RAM (SRAM).

The GPU 100 may effectively perform an operation related to computer graphics processing according to a control of the CPU 60. The GPU 100 is an example of a graphics processor including a graphics pipeline.

According to some example embodiments, the GPU 100 may analyze graphics state (or status) data, and control a domain shader so that the domain shader may generate all first primitives through a single-pass domain shading or generate only second primitives which are visible among the first primitives through a two-pass domain shading according to a result of the analysis.

According to some example embodiments, the CPU 60 may analyze graphics state data, generate a control signal according to a result of the analysis, and transmit the generated control signal to the GPU 100. Here, the GPU 100 may control a domain shading, e.g., a single-pass domain shading or a two-pass domain shading, of a domain shader in response to the control signal.

The display controller 90 may control an operation of the display 300. For example, the display controller 90 may transmit image data output from the external memory 200, e.g., still image data, moving image data, 3D image data or stereoscopic 3D image data to the display 300.

For example, the display controller 90 may support an MIPI® display serial interface or an embedded Display Port (eDP).

The memory interface 95 may perform a function of a memory controller which may access the memory 200. For example, the data processing device 50, e.g., the CPU 60 and/or the GPU 100, may communicate with the external memory 200 through the memory interface 95. That is, the CPU 60 and/or the GPU 100 may transmit or receive data to/from the external memory 200 through the memory interface 95.

The external memory 200 may store an operating system (OS), application programs, other program modules, and/or program data. According to a control of the CPU 60, an OS, application programs, other program modules, and/or program data stored in the external memory 200 may be loaded to the RAM 80.

A 3D application, a 3D game application, or software (or API) which may perform the method for domain shading described in the inventive concept, which is stored in the external memory 200 may be loaded from the external memory 200 to the RAM 80.

The external memory 200 may be embodied as a volatile memory or a non-volatile memory. The volatile memory may be embodied as a dynamic random access memory (DRAM), a static random access memory (SRAM), a thyristor RAM (T-RAM), a zero capacitor RAM (Z-RAM), or a Twin Transistor RAM (TTRAM).

The non-volatile memory device may be embodied as an Electrically Erasable Programmable Read-Only Memory (EEPROM), a flash memory, a Magnetic RAM (MRAM), a Spin-Transfer Torque (STT)-MRAM, a Conductive bridging RAM (CBRAM), a Ferroelectric RAM (FeRAM), a Phase change RAM (PRAM), a Resistive RAM (RRAM), a Nanotube RRAM, a Polyumer RAM (PoRAM), a Nano Floating Gate Memory (NFGM), a holographic memory, a Molecular Electronics Memory Device, or an Insulator Resistance Change Memory.

According to some example embodiments, the external memory 200 may be embodied as a hard disk drive (HDD) or a solid state drive (SSD). According to some example embodiments, the external memory 200 may be embodied as a removable storage media or a non-removable storage media. For example, the external memory 200 may be embodied as a secure digital (SD) card, a multimedia card (MMC), a universal flash storage (UFS), an embedded multimedia card (eMMC), or a USB flash drive.

The display 300 may display an image corresponding to image data output from the display controller 90. For example, the display 300 may be embodied in a touch screen, a liquid crystal display (LCD), a thin film transistor-liquid crystal display (TFT-LCD), a liquid emitting diode (LED) display, an organic LED (OLED) display, an active matrix OLED (AMOLED) display, or flexible display.

Figure 2:
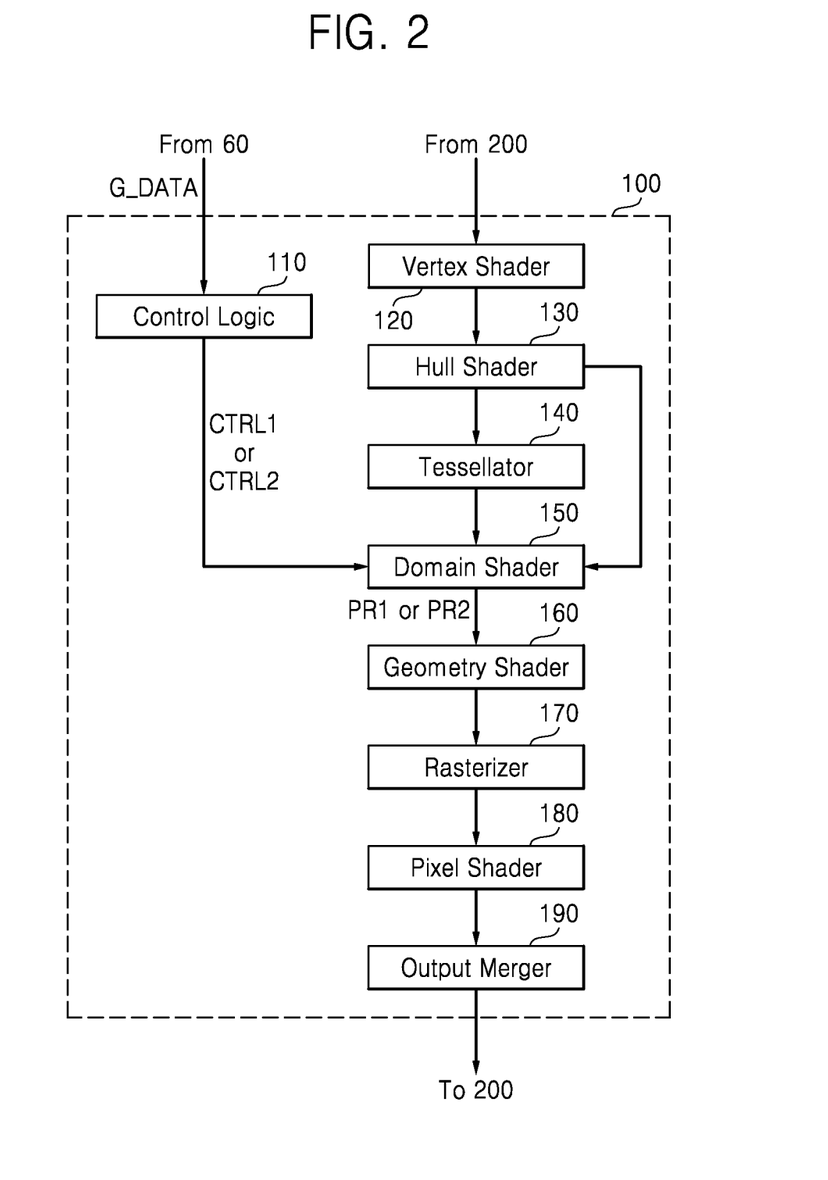
FIG. 2 is a schematic block diagram of a graphics processing unit illustrated in FIG. 1.

FIG. 2 is a schematic block diagram of the graphics processing unit illustrated in FIG. 1. Referring to FIGS. 1 and 2, the GPU 100 may receive data output from the CPU 60 and/or data output from the memory 200 through the memory interface 95, or transmit data processed by the GPU 100 to the memory 200; however, the CPU 60 and the memory interface 95 are not illustrated in FIG. 2 for convenience of description.

The GPU 100 may include a control logic 110, a vertex shader 120, a hull shader 130, a tessellator 140, a domain shader 150, a geometry shader 160, a rasterizer 170, a pixel shader 180, and an output merger 190.

A function and an operation of the components 120, 130, 140, 160, 170, 180, and 190 except the control logic 110 and a domain shader 150 of the GPU 100 in which a technical concepts of the present embodiment is included may be substantially the same as a function and an operation included in a graphics pipeline of Microsoft Direct3D™ 11. Therefore, detailed description of the components 120, 130, 140, 160, 170, 180, and 190 of the GPU 100 will be omitted.

Moreover, each function of the hull shader 130, the tessellator 140, and the domain shader 150 may be substantially the same as each function of a tessellation control shader of Khronos OpenGL™ 4.0, a tessellation primitive generation, and a tessellation evaluation shader.

The control logic 110 may control an entire operation of the GPU 100. For example, the control logic 110 may control an operation of each component 120, 130, 1401, 150, 160, 170, 180, and 190. The control logic 110 may analyze graphics state data G_DATA transmitted from the CPU 60, and control a domain shading of the domain shader 150 according to a result of the analysis. The control logic 110 may be embodied in hardware or a circuit.

For example, the control logic 110 may analyze graphics state data G_DATA, generate a control signal CTRL1 or CTRL2 corresponding to a result of the analysis, and transmit the generated control signal CTRL1 or CTRL2 to the domain shader 150.

The graphics state data G_DATA may include data for an output structure of each component 120, 130, 140, 150, 160, 170, 180, and 190 and/or data for a program (or a shading program).

The program may include a vertex shader program, a hull shader program, a tessellator program, a domain shader program, a geometry shader program, a rasterizer program, a pixel shader program, and/or an output merger program.

The domain shader 150 may generate all first primitives PR1 through the single-pass domain shading or generate second primitives PR2 which are visible among the first primitives PR1 through the two-pass domain shading in response to a control of the control logic 110, i.e., the control signal CTRL1 or CTRL2.

The control logic 110 may analyze the number of attributes to be generated for each of the first primitives PR1 from the domain shader output structure included in the graphics state data G_DATA. For example, when the number of attributes to be generated for each of the first primitives PT1 is smaller than a set (or reference) value, the control logic 110 may generate a first control signal CTRL1 so that the domain shader 150 may perform the single-pass domain shading.

For example, the attributes to be generated may include attributes such as a position, a color, a diffuse color, a normal vector, a tangent vector, a bitangent vector or a binormal vector, a texture coordinate, and/or a world coordinate. The attributes to be generated may further include user-defined values.

According to an example embodiment, the set value may be set or programmed from outside. According to another example embodiment, the set value may be set or programmed by the CPU 60.

The control logic 110 may analyze whether to activate a blending operation according to a shading program included in the graphics state data G-DATA. For example, when the blending operation is activated, the control logic 110 may generate the first control signal CTRL1 so that the domain shader 150 may perform the single-pass domain shading.

The control logic 110 may analyze each depth value of the first primitives PR1 through a depth modification calculation according to a shading program included in the graphics state data G_DATA.

For example, when relative depth values between the first primitives PR1 are not maintained through the depth modification calculation, the control logic 110 may generate the first control signal CTRL1 so that the domain shader 150 may perform the single-pass domain shading. According to an example embodiment, the depth modification calculation may be performed by the geometry shader 160 and/or the pixel shader 180.

When a range of two-dimensional space coordinates of the first primitives PR1 is not maintained through a location modification calculation performed by the geometry shader 160, the control logic 110 may generate the first control signal CTRL1 so that the domain shader 150 may perform the single-pass domain shading.

When (i) the number of attributes to be generated for each of the first primitives PR1 is greater than or equal to a set value, (ii) the blending operation is not activated, (iii) the range of two-dimensional space coordinates is maintained through the position modification calculation performed in the geometry shader 160, and (iv) relative depth values between the first primitives PR1 are maintained all the time after the first primitives PR1 are processed by the geometry shader 160, the control logic 110 may generate a second control signal CTRL2 so that the domain shader 150 may perform a two-pass domain shading.

Figure 3:
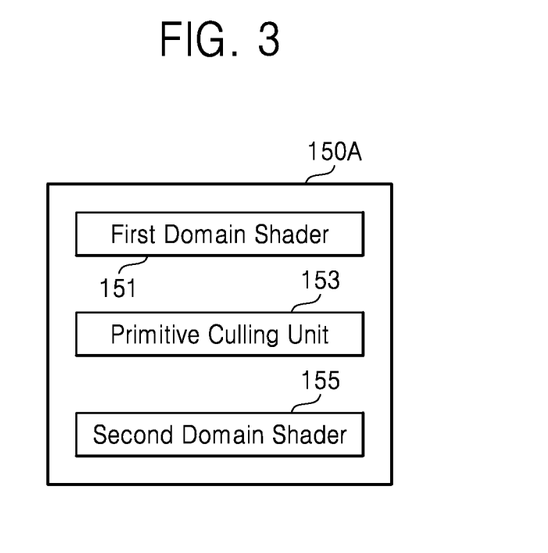
FIG. 3 is a schematic block diagram depicting an example embodiment of a domain shader illustrated in FIG. 2.

FIG. 3 is a schematic block diagram depicting an example embodiment of the domain shader illustrated in FIG. 2. Referring to FIGS. 2 and 3, a domain shader 150A, in response to the first control signal CTRL1, may calculate all attributes of the first primitives through a single-pass domain shading, and generate the first primitives according to a result of the calculation.

In addition, the domain shader 150A may generate only second primitives PR2 which are visible among the first primitives PR1 through the two-pass domain shading in response to the second control signal CTRL2. For example, the domain shader 150A may calculate first location attributes only among the attributes of the first primitives PR1, remove third primitives which are invisible among the first primitives PR1 according to the calculated location attributes, and calculate the rest attributes other than the location attributes of the second primitives PR2.

The domain shader 150A may include the first domain shader 151, the primitive culling unit 153, and the second domain shader 155. The domain shader 150A illustrated in FIG. 3 is an example embodiment of the domain shader 150 illustrated in FIG. 2.

Figure 4:
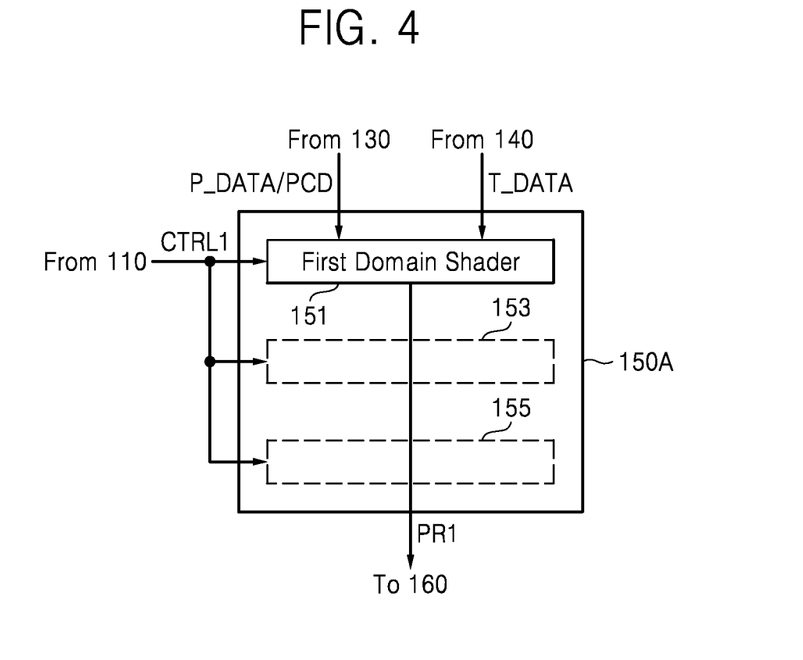
FIG. 4 is a conceptual diagram for describing a single-pass domain shading of the domain shader illustrated in FIG. 3.

FIG. 4 is a conceptual diagram for describing a single-pass domain shading of the domain shader illustrated in FIG. 3. Referring to FIGS. 2 to 4, the domain shader 150A may perform the single-pass domain shading according to a control of the control logic 110.

The first domain shader 151 may receive point data P_DATA and patch constant data PCD output from the hull shader 130, and tessellation data T_DATA output from the tessellator 140. The point data P_DATA may be attribute data of each point, e.g., vertex and/or control point, included in a patch. The attribute data may include data on attributes of each point such as location, color, normal vector, and/or texture coordinate.

The patch constant data PCD may include a tessellation factor (or tessellation factors), coefficients related to a patch equation, and/or user-defined values. For example, the tessellation factor may mean a level of detail (LOD). The tessellation factor may be an integer, a decimal fraction, or a floating-point.

The patch equation may be a curve equation or a surface equation. For example, the curve equation may be a Hermite curve equation, a Bezier curve equation, a NURBS curve equation, or a B-spline curve equation.

The tessellation data T_DATA may include UV coordinates or UVW coordinates of tessellated points of a patch and topology information on the tessellated points. The topology information may include connectivity information of each of the tessellated points.

The first domain shader 151 operating in response to a first control signal CTRL1 may calculate all attributes of each of the first primitives PR1 such as points, lines, and triangles using the point data P_DATA, the patch constant data PCD, and the tessellation data T_DATA and generate the first primitives PR1 according to a result of the calculation. For example, the first domain shader 151 may calculate all attributes of each point, e.g., vertex and/or control point, included in each of the first primitives PR1 to be generated based on the point data P_DATA, the patch constant data PCD, and the tessellation data T_DATA.

The first domain shader 151 may generate the first primitives PR1 based on all of the calculated attributes. Each of the primitive culling unit 153 and the second domain shader 155 may bypass the first primitives PR1 in response to the first control signal CTRL1. The domain shader 150A may generate all of the first primitives PR1 through a single-pass domain shading only using the first domain shader 151.

Figure 5:
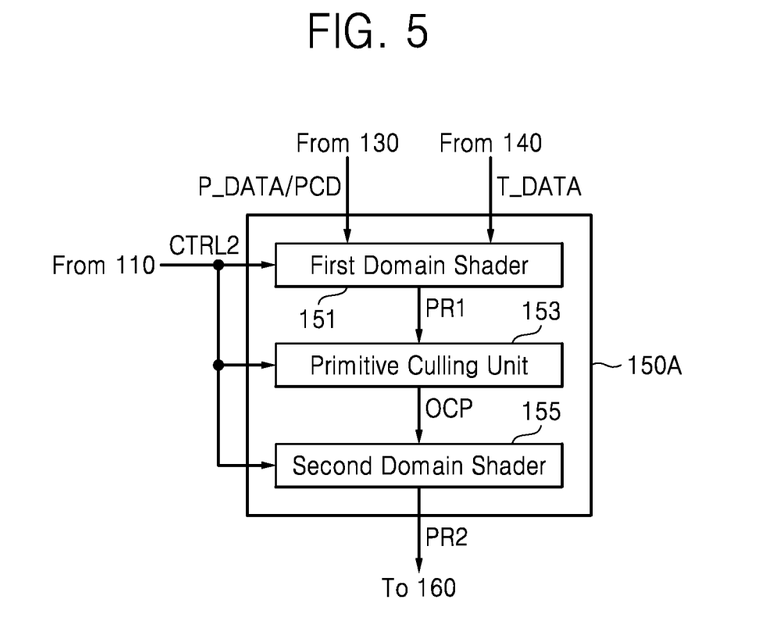
FIG. 5 is a conceptual diagram for describing two-pass domain shading of the domain shader illustrated in FIG. 3.

FIG. 5 is a conceptual diagram for describing a two-pass domain shading of the domain shader illustrated in FIG. 3. Referring to FIGS. 2, 3, and 5, the domain shader 150A may perform the two-pass domain shading according to a control of the control logic 110.

The first domain shader 151 may receive the point data P_DATA and the patch constant data PCD output from the hull shader 130, and the tessellation data T_DATA output from the tessellator 140.

The first domain shader 151 operating in response to the second control signal CTRL2 may calculate only a location (or a position) attribute, e.g., space coordinate, of each point, e.g., vertex and/or control point, included in each of the first primitives PR1 using the point data P_DATA, the patch constant data PCD, and the tessellation data T_DATA. For example, the space coordinates may be defined by (x, y, z).

The first domain shader 151 may generate the first primitives PR1 only having location attributes using the calculated space coordinates.

The primitive culling unit 153 may remove the third primitives, which are invisible among the first primitives only having location attributes, in response to the second control signal CTRL2. That is, the primitive culling unit 153 may remove the third primitives which are unnecessary, and generate only the second primitives PR2 which are visible. For example, the primitive culling unit 153 may compare a location attribute, e.g., space coordinate, of the first primitive with a location attribute of the second primitive.

When a range of two-dimensional coordinates of the second primitive is included in the range of two-dimensional coordinates (e.g., an x-axis and y-axis coordinate) of the first primitive, and a depth coordinate (e.g., a z-axis coordinate) of the first primitive is smaller than a depth coordinate of the second primitive, the primitive culling unit 153 may determine that the first primitive is a visible primitive and the second primitive is an invisible primitive, and remove the second primitive according to a result of the determination. According to an example embodiment, the primitive culling unit 153 may remove invisible primitive(s) using a view-frustum culling, an occlusion culling, or a back-face culling.

The primitive culling unit 153 may output each point OCP included in each of the second primitives PR2 to the second domain shader 155.

The second domain shader 155 may calculate the rest attributes other than the location attributes of the second primitives PR2. For example, the second domain shader 155 may calculate the rest attributes other than the location attribute of each point OCP included in each of the second primitives PR2, and generate the second primitives PR2 according to a result of the calculation.

The domain shader 150A may generate second primitives PR2 which are visible among the first primitives PR1 through the two-pass domain shading using the first domain shader 151, the primitive culling unit 153, and the second domain shader 155. The domain shader 150A may remove unnecessary primitives on a primitive basis and calculate only the remaining primitives, thereby decreasing unnecessary amount of workload and/or unnecessary data. In addition, the domain shader 150A may reduce power consumption caused by the unnecessary amount of workload. Accordingly, an entire performance of the GPU 100 may be improved and power consumption of the GPU 100 may be reduced.

Figure 6:
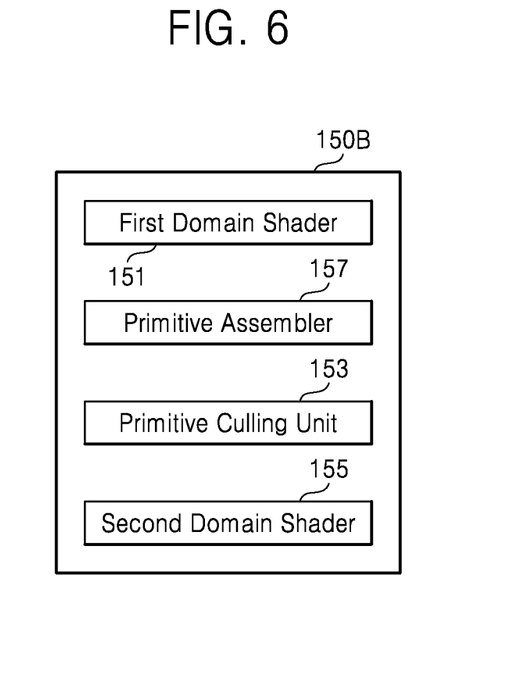
FIG. 6 is a schematic block diagram depicting another example embodiment of the domain shader illustrated in FIG. 2.
Figure 7:
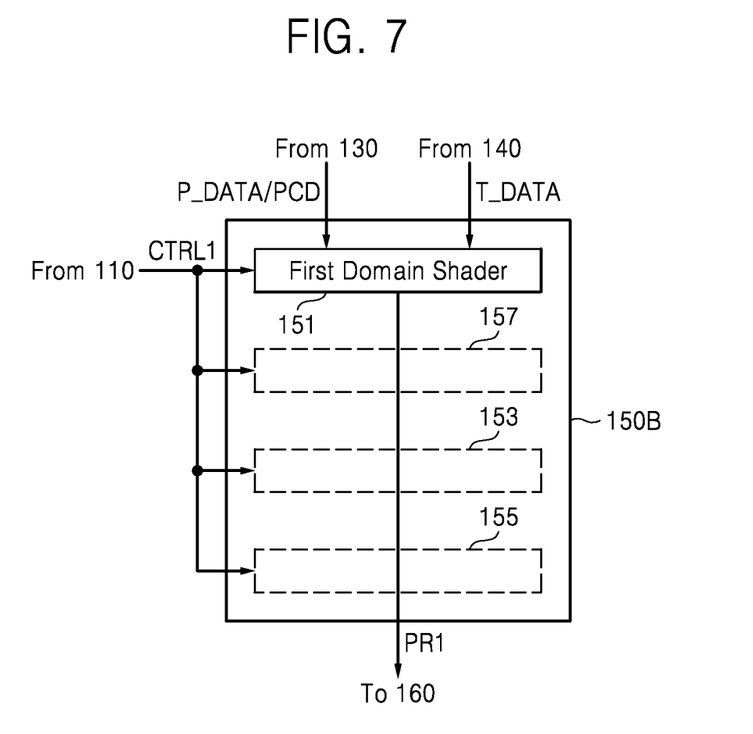
FIG. 7 is a conceptual diagram for describing a single-pass domain shading of the domain shader illustrated in FIG. 6.
Figure 8:
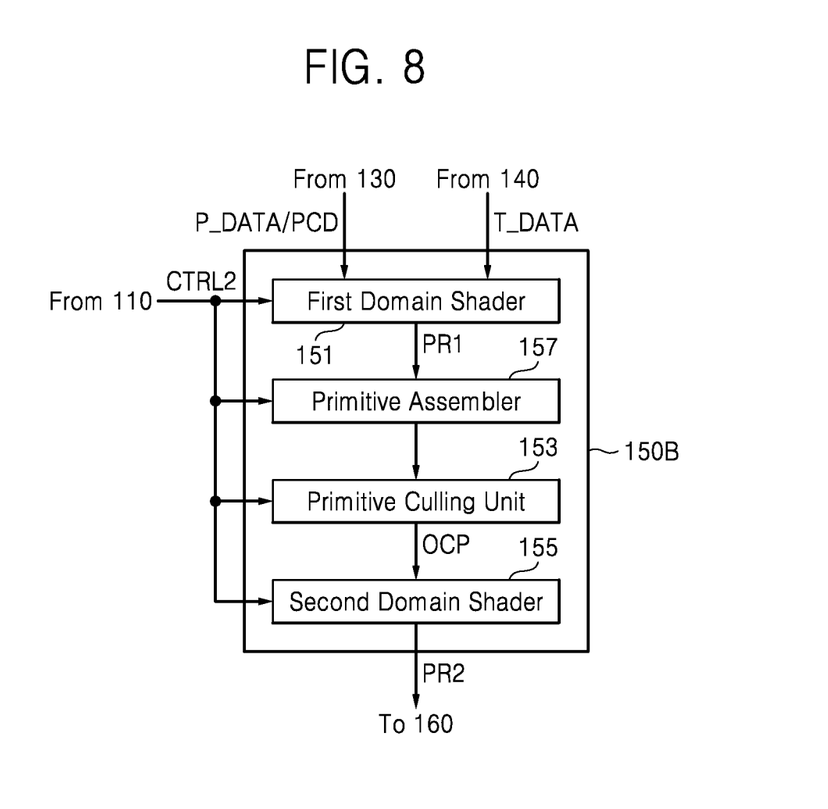
FIG. 8 is a conceptual diagram for describing two-pass domain shading of the domain shader illustrated in FIG. 6.

FIG. 6 is a schematic block diagram depicting another example embodiment of the domain shader illustrated in FIG. 2, FIG. 7 is a conceptual diagram for describing a single-pass domain shading of the domain shader illustrated in FIG. 6, and FIG. 8 is a conceptual diagram for describing two-pass domain shading of the domain shader illustrated in FIG. 6.

Referring to FIGS. 2 and 6, a domain shader 150B may include the first domain shader 151, the primitive culling unit 153, the second domain shader 155, and a primitive assembler 157.

Except for an operation of the primitive assembler 157, the operation of the domain shader 150A illustrated in FIG. 3 is substantially the same as an operation of the domain shader 150B illustrated in FIG. 6.

As illustrated in FIGS. 6 and 7, the domain shader 150B may generate all of the first primitives PR1 through the single-pass domain shading, which uses only the first shader 151, in response to the first control signal CTRL1. As illustrated in FIGS. 6 and 8, the domain shader 150B may generate only second primitives PR2 which are visible among the first primitives PR1 through the two-pass domain shading in response to the second control signal CTRL2.

As illustrated in FIG. 8, the first domain shader 151 may calculate a location attribute, e.g., space coordinate, of each point included in each of the first primitives PR1 using the point data P_DATA, the patch constant data PCD, and the tessellation data T_DATA in response to the second control signal CTRL2. For example, the space coordinate may be defined by (x, y, z).

The first domain shader 151 may transmit the space coordinate calculated for each point included in each of the first primitives PR1 to the primitive assembler 157.

The primitive assembler 157 may generate the first primitives PR1 only having location attributes using the calculated space coordinate. For next processing, the generated first primitives PR1 may be supplied to the primitive culling unit 153. That is, the primitive culling unit 153 may remove third primitives which are invisible among the first primitives PR1 only having location attributes, and generate only the second primitives PR2 which are visible.

An operation of the primitive culling unit 153 and the second domain shader 155 of the domain shader 150B illustrated in FIG. 6 or 8 may be substantially the same as an operation of the primitive culling unit 153 and the second domain shader 155 illustrated in FIG. 5.

Figure 9:
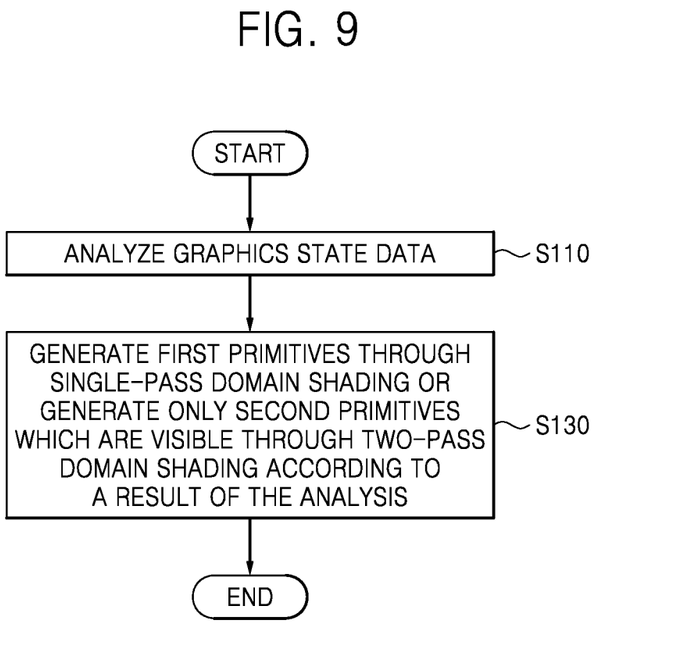
FIG. 9 is a flowchart for describing an operation of the data processing system illustrated in FIG. 1.

FIG. 9 is a flowchart for describing an operation of the data processing system illustrated in FIG. 1. Referring to FIGS. 1 to 9, the data processing device 50 may analyze the graphics state data G_DATA (S110). According to an example embodiment, the graphics state data G_DATA may be analyzed by the CPU 60 and/or the GPU 100.

The data processing device 50 may generate all of the first primitives PR1 through a single-pass domain shading or generate only second primitives which are visible through the two-pass domain shading according to a result of the analysis (S130).

A method for domain shading and/or devices performing the same according to an example embodiment of the present inventive concepts may perform a single-pass domain shading or a two-pass domain shading according to a result of the analysis of graphics state data.

The method and the devices may remove unnecessary primitives on a primitive basis through the two-pass domain shading and calculate only the remaining primitives, thereby decreasing an amount of workload. Accordingly, according to the decrease in the amount of workload, an entire performance of a graphics processing unit may be improved, and power consumption of the graphics processing unit may be reduced.

Although a few embodiments of the present general inventive concepts have been shown and described, it will be appreciated by those skilled in the art that changes may be made in these embodiments without departing from the principles and spirit of the general inventive concept, the scope of which is defined in the appended claims and their equivalents.

What is claimed is:

1. A method for domain shading comprising:
analyzing graphics state data;
generating a first control signal when a blending operation is active;
generating all first primitives through a single-pass domain shading based on a result of the analysis and when the first control signal is received by a domain shader;
generating a second control signal when the blending operation is inactive; and
generating only second primitives which are visible among the first primitives through a two-pass domain shading based on the result of the analysis and when the second control signal is received by the domain shader.

2. The method of claim 1, wherein, when a number of attributes to be generated for each of the first primitives is smaller than a set value, the generating calculates all of the attributes of the first primitives through the single-pass domain shading, and generates the first primitives based on a result of the calculation.

3. The method of claim 1, wherein, when the blending operation is activated, the generating calculates all attributes of the first primitives through the single-pass domain shading and generates the first primitives based on a result of the calculation.

4. The method of claim 1, wherein, when a range of two-dimensional space coordinates of the first primitives is changed through a location modification calculation performed by a geometry shader, the generating calculates all attributes of the first primitives through the single-pass domain shading and generates the first primitives based on a result of the location modification calculation.

5. The method of claim 1, wherein, when relative depth values between the first primitives are changed through a depth modification calculation after the first primitives are processed by a geometry shader, the generating calculates all attributes of the first primitives through the single-pass domain shading and generates the first primitives based on a result of the depth modification calculation.

6. The method of claim 5, wherein the depth modification calculation is performed by the geometry shader or a pixel shader.

7. The method of claim 1, wherein, when a number of attributes to be generated for each of the first primitives is greater than or equal to a set value, the blending operation is not activated, a range of two-dimensional space coordinates of the first primitives is not changed through a location modification calculation performed by a geometry shader, and relative depth values of the first primitives are maintained all the time after the first primitives are processed by the geometry shader,
the generating calculates first location attributes only among attributes of the first primitives through the two-pass domain shading, removes third primitives which are invisible among the first primitives based on the calculated first location attributes, calculates attributes other than the first location attributes of the second primitives, and generates the second primitives based on a result of the calculation of the attributes other than the first location attributes.

8. The method of claim 1, wherein, the analyzing is performed by a central processing unit (CPU) or a graphics processing unit (GPU).

9. A graphics processing unit (GPU) comprising:
a control logic configured to analyze graphics state data and control a domain shading based on a result of the analysis; and
a domain shader including,
a first domain shader configured to calculate space coordinates included in first primitives using data output from a hull shader and tessellation data output from a tessellator;
a primitive assembler configured to generate the first primitives having only location attributes using the calculated space coordinates;
a primitive culling unit configured to remove primitives which are invisible among the first primitives having only location attributes and generate only second primitives which are visible; and
a second domain shader configured to calculate attributes other than location attributes of the second primitives,
wherein the control logic is configured to control the domain shader either to generate all of the first primitives through a single-pass domain shading or to generate the second primitives through a two-pass domain shading.

10. The GPU of claim 9, wherein, when a number of attributes to be generated for each of the first primitives is smaller than a set value, the control logic is configured to control the domain shader so that the domain shader may perform the single-pass domain shading.

11. The GPU of claim 9, wherein, when a blending operation is activated, the control logic is configured to control the domain shader so that the domain shader may perform the single-pass domain shading.

12. The GPU of claim 9, wherein, when a range of two-dimensional space coordinates of the first primitives is changed through a location modification calculation performed by a geometry shader, the control logic is configured to control the domain shader so that the domain shader may perform the single-pass domain shading.

13. The GPU of claim 9, wherein, when relative depth values between the first primitives are changed through a depth modification calculation after the first primitives are processed by a geometry shader, the control logic is configured to control the domain shader so that the domain shader may perform the single-pass domain shading.

14. The GPU of claim 9, wherein, when a number of attributes to be generated for each of the first primitives is greater than or equal to a set value, a blending operation is not activated, a range of two-dimensional space coordinates of the first primitives is not changed through a location modification calculation performed by a geometry shader, and relative depth values between the first primitives are maintained all the time after the first primitives are processed by the geometry shader, the control logic is configured to control the domain shader so that the domain shader may perform the two-pass domain shading.

15. A system on chip (SoC) comprising:
a graphics processing unit (GPU); and
a central processing unit (CPU) configured to control the graphics processing unit, the GPU including,
 a control logic configured to analyze graphics state data and control a domain shading based on a result of the analysis; and
 a domain shader,
wherein the domain shader includes,
a first domain shader configured to calculate space coordinates included in first primitives using data output from a hull shader and tessellation data output from a tessellator;
a primitive assembler configured to generate first primitives having only location attributes using the calculated space coordinates;
a primitive culling unit configured to remove primitives which are invisible among the first primitives having only location attributes and generate only second primitives which are visible; and
a second domain shader configured to calculate attributes other than location attributes of the second primitives,
wherein the control logic is configured to control the domain shader either to generate all of the first primitives through a single-pass domain shading or to generate the second primitives through a two-pass domain shading.

16. The SoC of claim 15, wherein, when a number of attributes to be generated for each of the first primitives is smaller than a set value, the control logic is configured to control the domain shader so that the domain shader may perform the single-pass domain shading.

17. The SoC of claim 15, wherein, when a blending operation is activated, the control logic is configured to control the domain shader so that the domain shader may perform the single-pass domain shading.

18. The SoC of claim 15, wherein, when a range of two-dimensional space coordinates of the first primitives is changed through a location modification calculation performed by a geometry shader, the control logic is configured to control the domain shader so that the domain shader may perform the single-pass domain shading.

19. The SoC of claim 15, wherein, when relative depth values between the first primitives are changed through a depth modification calculation after the first primitives are processed by a geometry shader, the control logic is configured to control the domain shader so that the domain shader may perform the single-pass domain shading.

20. The SoC of claim 15, wherein, when a number of attributes to be generated for each of the first primitives is greater than or equal to a set value, a blending operation is not activated, a range of two-dimensional space coordinates of the first primitives is not changed through a location modification calculation performed by a geometry shader, and relative depth values between the first primitives are maintained all the time after the first primitives are processed by a geometry shader, the control logic is configured to control the domain shader so that the domain shader may perform the two-pass domain shading.

* * * * *